US011691367B2

(12) United States Patent
Mirto et al.

(10) Patent No.: US 11,691,367 B2
(45) Date of Patent: Jul. 4, 2023

(54) METHOD AND APPARATUS FOR HANDLING TYRES

(71) Applicant: Pirelli Tyre S.p.A., Milan (IT)

(72) Inventors: Antonio Mirto, Milan (IT); Stefano Giovanni, Milan (IT); Gaetano Lo Presti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 1376 days.

(21) Appl. No.: 16/060,763

(22) PCT Filed: Nov. 23, 2016

(86) PCT No.: PCT/IB2016/057060
§ 371 (c)(1),
(2) Date: Jun. 8, 2018

(87) PCT Pub. No.: WO2017/103710
PCT Pub. Date: Jun. 22, 2017

(65) Prior Publication Data
US 2018/0370169 A1    Dec. 27, 2018

(30) Foreign Application Priority Data

Dec. 17, 2015    (IT) ........................ 102015000084428

(51) Int. Cl.
*B29D 30/00*    (2006.01)

(52) U.S. Cl.
CPC .. *B29D 30/0016* (2013.01); *B29D 2030/0022* (2013.01)

(58) Field of Classification Search
None
See application file for complete search history.

(56) References Cited

U.S. PATENT DOCUMENTS 4,881,882 A * 11/1989 Fantacci ................ B65G 47/90
209/539
5,631,028 A    5/1997 Mizokawa et al.
(Continued)

FOREIGN PATENT DOCUMENTS

CN    1579749 A    2/2005
CN    1635960 A    7/2005
(Continued)

OTHER PUBLICATIONS

ESpaceNet Translation of EP3381669 (Year: 2022).*
(Continued)

*Primary Examiner* — Robert C Dye
*Assistant Examiner* — Alexander D Booth
(74) *Attorney, Agent, or Firm* — Finnegan, Henderson, Farabow, Garrett & Dunner, L.L.P.

(57) ABSTRACT

The invention relates to a method and an apparatus of handling tyres. The method includes: —generating a first relative motion between a detecting line (4) and a tyre (100) for acquiring the position of a first edge (106) of a tyre (100) with respect to a reference (5); —generating a second relative motion between said detecting line (4) and said tyre (100) and acquiring the position of a second edge (107) of said tyre (100) with respect to said reference (5); —positioning a gripping device and gripping said tyre (100) on the basis of the positions of said first and second edge (107) with respect to said reference (5).

28 Claims, 8 Drawing Sheets

(56) References Cited

U.S. PATENT DOCUMENTS

| | | | |
|---|---|---|---|
| 5,882,457 A | 3/1999 | Currie et al. | |
| 2009/0061099 A1 | 3/2009 | Hendricks, Sr. | |
| 2015/0125241 A1 | 5/2015 | Moynet, Jr. et al. | |
| 2015/0165704 A1 | 6/2015 | Thalgott, Jr. et al. | |

FOREIGN PATENT DOCUMENTS

| | | | | |
|---|---|---|---|---|
| CN | 101022945 A | | 8/2007 | |
| CN | 201913813 U | | 8/2011 | |
| EP | 0 813 952 A2 | | 12/1997 | |
| EP | 1150829 A1 | * | 11/2001 | ......... B29D 30/0016 |
| EP | 3381669 A1 | * | 10/2018 | |
| JP | H 3-205133 A | | 9/1991 | |
| JP | 11228070 A | * | 8/1999 | |
| JP | 2009-083370 A1 | | 4/2009 | |

OTHER PUBLICATIONS

ESpaceNet Translation of JPH11228070 (Year: 2022).*
Notification of the First Office Action dated Dec. 23, 2019, from China National Intellectual Property Administration, in counterpart Chinese Application No. 201680078562.5.
International Search Report form the European Patent Office in corresponding International Application No. PCT/IB2016/057060 dated Mar. 23, 2017.
Written Opinion of the International Searching Authority from the European Patent Office in corresponding International Application No. PCT/IB2016/057060 dated Mar. 23, 2017.

* cited by examiner

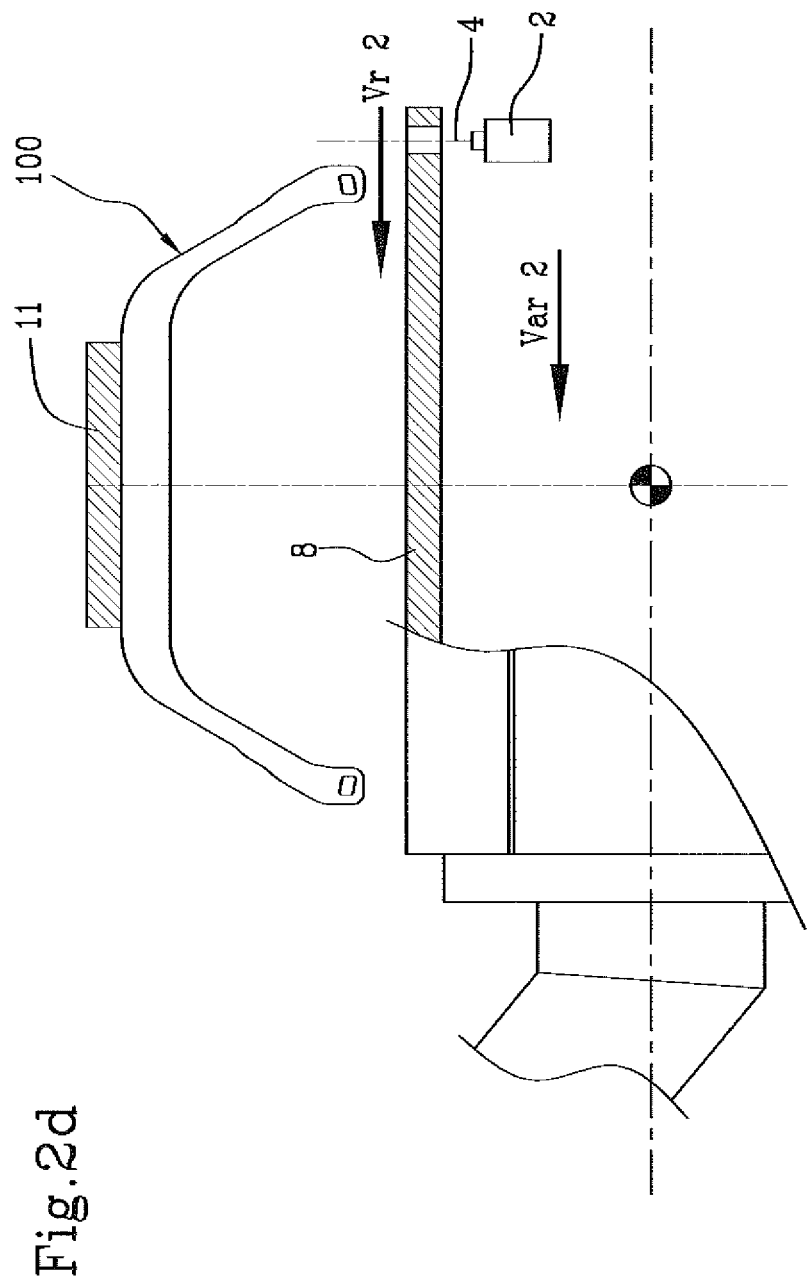

METHOD AND APPARATUS FOR HANDLING TYRES

CROSS REFERENCE TO RELATED APPLICATIONS

This application is a Section 371 national phase application based on International Application No. PCT/162016/057060, filed Nov. 23, 2016, which claims the priority of Italian Patent Application No. 102015000084428, filed Dec. 17, 2015; the contents of each application expressly incorporated herein by reference.

The present invention relates to a method and an apparatus for handling tyres, in particular green tyres.

A tyre for vehicle wheels generally comprises a carcass structure comprising at least one carcass ply having respectively opposite end flaps engaged with respective annular anchoring structures, integrated in the areas usually identified by the name of "beads", having an inner diameter substantially corresponding to a so-called "fitting diameter" of the tyre on a respective mounting rim.

The carcass structure is associated with a belt structure which may comprise one or more belt layers, arranged in radial superposition with respect to each other and with respect to the carcass ply, having textile or metallic reinforcing cords with crossed orientation and/or substantially parallel to the circumferential development direction of the tyre (0 degree layer). A tread band is applied in a position radially outer to the belt structure, made of elastomeric material like other semi-finished products making up the tyre.

Respective sidewalls of elastomeric material are further applied in an axially outer position on the lateral surfaces of the carcass structure, each extending from one of the lateral edges of the tread band up at the respective annular anchoring structure to the beads.

After the building of the green tyre, carried out by assembling respective components, a moulding and vulcanisation treatment is generally carried out in order to determine the structural stabilisation of the tyre through cross-linking of the elastomeric compositions, as well as to impart a desired tread pattern onto the same, where required, and any distinguishing or information graphic signs at the tyre sidewalls.

The green tyre, although not yet stabilised, is defined by a toroidal structure which develops about an axis of rotation and substantially symmetrical with respect to an axial middle line plane perpendicular to said axis of rotation. In particular, the toroidal structure extends between the two beads which, in the green tyre, represent substantially the outermost edges along the axial direction of the green tyre itself. In a vulcanised tyre, the substantially outermost edges along the axial direction are instead typically positioned at the sidewalls.

The term "elastomeric material" is used to designate a composition comprising at least one elastomeric polymer and at least one reinforcement filler. Preferably, such composition further comprises additives such as, for example, a cross-linking agent and/or a plasticizer. Due to the presence of the cross-linking agent, such material can be cross-linked by heating, so as to form the final manufactured article.

The term "tyre" is used to designate any green tyre, i.e. a tyre obtained at the end of the building process and not yet moulded and vulcanised, as well as a moulded and vulcanised tyre.

"Axial middle line plane" is used to designate a plane perpendicular to the axis of rotation and equidistant from the axially outer portions of the tyre itself.

"Detecting line" is used to designate an interception line representative of the direction of operation of a detector adapted to recognise the presence of the tyre.

"Edge" of a tyre means a strategic portion in at least the theoretical profile of the tyre, for example the axially outermost profile portion of the tyre. Examples of edges may be represented by the beads (representative of the extreme positions of the green tyre), or by the sidewalls, or by the passage positions between sidewalls and tread.

The term "within the tyre" means the substantially cylindrical zone close to the axis of rotation of the tyre extending axially and radially between the beads.

In highly automated tyre building processes, during the building steps, the shape of the tyre being processed is generally defined by the building drum thereof so as to facilitate the handling of the drum/tyre being processed assembly. This aspect is even more evident in the case of so-called "one-step" processes in which the carcass is separated from the building drum thereof only at the end of the entire building process, in the form of green tyre.

Between the end of the building process and the beginning of the moulding and vulcanisation, some ancillary actions are generally carried out on the green tyre uncoupled from the building drum thereof, including the application of a barcode, the application of one or more product labels or, more generically, the green tyre is transferred to an automatic handling apparatus. These ancillary actions are carried out by using handling apparatus which may include gripping devices of the green tyre.

The Applicant has noted that in executing these ancillary actions, the green tyre does not have a geometrically stable shape as it is not yet vulcanised and no longer supported by said forming drum.

The Applicant has perceived that this circumstance does not allow achieving greater automation of the manufacturing process of the tire, starting from the building up to the moulding/vulcanisation step.

The Applicant has further perceived that, in order to automate also said processes downstream of the building process of a tyre, it is not necessary completely stabilise the shape of the green tyre, thereby prolonging the pause time of the tyre in the process part relating to said ancillary actions, but it may be sufficient to obtain the position of the tyre, starting from the detection of certain reference points belonging to the tyre itself.

The Applicant has found that the acquisition of the position of two edges of the green tyre, as a function of the position of a predetermined reference, allows managing in an automated manner ancillary actions that require handling of the green tyre itself, without adversely affecting the pause time of the green tyre during the manufacturing process.

The Applicant has also found that such acquisition may also be advantageously used for any handling of the tyre to be carried out at the end of the moulding and vulcanisation process.

According to a first aspect thereof, the present invention relates to a method of handling tyres.

Preferably, the method includes generating a first relative motion between a detecting line and a tyre for acquiring, by means of said detecting line, the position of a first edge of said tyre with respect to a reference.

Preferably, the method includes generating a second relative motion between said detecting line and said tyre for acquiring, by means of said detecting line, the position of a second edge of said tyre with respect to said reference.

Preferably, the method includes positioning a gripping device and gripping said tyre by means of said gripping device on the basis of the positions of said first and second edge with respect to said reference.

The Applicant believes that by operating with two relative motions to acquire the position of two edges of the tyre it is possible to grip the tyre in a controlled manner as a function of the position of these two edges up to get to know the position thereof in space with respect to the selected reference.

The Applicant also believes that by operating according to a handling method according to the present invention, it is possible to also automate the ancillary actions without a negative impact on the pause times.

According to a second aspect thereof, the present invention relates to an apparatus for handling tyres.

Preferably, the handling apparatus includes a gripping device comprising at least one detector adapted to detect an edge of a tyre at a detecting line defined by the detector itself, wherein said detector is positioned at a predetermined distance with respect to a reference.

Preferably, the handling apparatus includes a control unit operatively associated with said gripping device.

Preferably, the control unit is programmed to execute a handling method of said tyres.

The Applicant believes that the handling apparatus according to the present invention allows optimising the managing of the tyre also during the actions that are ancillary to the actual manufacture, without weighing down or making the apparatus structure itself excessively complex.

In one or more of the above aspects, the present invention may comprise one or more of the following features.

Preferably, in order to generate said first relative motion and/or said second relative motion, said detecting line and/or said tyre are moved parallel to an axial direction of said tyre.

The Applicant believes that the movement parallel to the axial direction allows simplifying both the acquisition of the position of the tyre edges and the gripping of the tyre.

Preferably, said detecting line is arranged perpendicularly to said axial direction.

Preferably, in order to generate said first and/or said second relative motion, said detecting line and/or said tyre are moved substantially according to an axial direction of said tyre.

Preferably, in order to generate said first and/or said second relative motion, said detecting line is moved within said tyre.

The Applicant believes that movement of the detector within the tyre allows operating to effectively achieve an inner grip while the tyre is externally retained by suitable transfer devices.

Preferably, said first edge and second edge are the axially outermost edges of the tyre. Even more preferably, said first edge and second edge are the edges arranged each at a bead respectively on opposite sides with respect to an axial middle line plane of the tyre.

The Applicant believes that the choice of the area at the two beads allows defining the position in space of the gripping areas, within the tyre, and possibly extrapolating additional data, such as the distance between the two edges.

Preferably, it is contemplated to calculate the geometric centre of the tyre with respect to said reference, starting from the distance between said first and second edge.

Preferably, it is contemplated to calculate the distance between said first edge and said second edge.

Preferably, it is contemplated to determine the position in space of the tyre starting from the position of the first and second edge, from the position of the geometric centre and from preset data related to the theoretical profile of the tyre.

The Applicant believes that knowing the position in space of the tyre allows optimising both the grip and the subsequent ancillary actions.

Preferably, said gripping device is integral with said detecting line and defines said reference.

The Applicant believes that the handling of the tyre is simplified by providing the detecting line directly on the gripping device.

Preferably, positioning said gripping device includes generating a relative positioning motion between said gripping device and said tyre for reaching a predetermined mutual gripping position in which said gripping device protrudes by a predetermined distance from said first or second edge, before gripping said tyre. The Applicant believes that it is possible to manage both the overall dimensions of the tyre and of the gripping device with respect to the subsequent stations.

Preferably, said gripping device includes a radial expansion clamp comprising said reference and carried by one end of an anthropomorphic robot movable with respect to said tyre, said detecting line being arranged on a sector of said radial expansion clamp. Even more preferably, gripping said tyre includes expanding said radial expansion clamp within said tyre on the basis of the position of said first edge and said second edge.

The Applicant believes that the use of a radial expansion clamp represents one of the most effective ways to transfer a tyre, and that it is further optimised by performing the grip as a function of the position of the first edge and the second edge.

Preferably, the geometric centre position of the tyre is determined with respect to said radial expansion clamp.

Preferably, generating said first and/or said second relative motion includes generating a relative intercepting motion in which said detecting line has a controlled interception speed with respect to the tyre, having a direction adapted to intercept said first edge and/or said second edge, respectively.

Preferably, said gripping device is moved within said tyre.

Preferably, generating said first or said second relative motion includes continuing said relative intercepting motion until said detecting line intercepts said first edge or said second edge of said tyre. Even more preferably, generating said first or said second relative motion includes inverting said relative intercepting motion by generating a relative detecting motion between said detecting line and said tyre, wherein said detecting line has a controlled detecting speed with respect to the tyre, having opposite direction and lower modulus than the controlled intercepting speed. Even more preferably, generating said first or said second relative motion includes continuing said relative detecting motion until said detecting line intercepts said first edge or said second edge again, detecting the position thereof with respect to said reference.

The Applicant believes that performing the acquisition at two different speeds allows not prolonging the pause time of the tyre in the ancillary part of the manufacturing process and, at the same time, automating the whole process. In particular, the Applicant believes that these advantages are achieved by generating, between a detector and a tyre, a relative intercepting motion at high speed to recognise the presence of the tyre, and a relative detecting motion at low speed to detect the exact position of the intercepted edge with respect to a reference.

Preferably, it is contemplated to carry out at least one ancillary action on said gripped tyre on the basis of the positions of said first and second edge with respect to said reference. Even more preferably, said ancillary action comprises at least one action selected from applying a barcode, applying one or more product labels, releasing said tyre to an automatic handling apparatus.

Preferably, said gripping device includes a radial expansion clamp provided with a plurality of radially expandable sectors and carried by an end of an anthropomorphic robot.

The Applicant believes that this embodiment is particularly versatile and allows working at high speeds.

Preferably, said control unit is programmed to move said clamp within the tyre for generating said first and second relative motion.

Preferably, said control unit is programmed for expanding said radial expansion clamp within said tyre on the basis of the position of said first edge and said second edge.

The Applicant believes that the use of a radial expansion clamp within the tyre is the embodiment which optimises the results of the automation of the ancillary actions.

Preferably, said control unit is programmed for generating a relative positioning motion between said gripping device and said tyre for reaching a predetermined mutual gripping position in which said gripping device protrudes by a predetermined distance from said first or second edge, before gripping said tyre.

Preferably, said detector is arranged on a sector of said radial expansion clamp so that said detecting line is arranged perpendicular to said sector.

Preferably, said detector is arranged on a sector at a distance from the free end of the radial expansion clamp that defines the reference on the radial expansion clamp itself.

Preferably, said detector is arranged on said gripping device so that said detecting line is arranged perpendicular to an axial direction of the tyre.

Preferably, said control unit is programmed for determining the position in space of the tyre starting from the position of the first and second edge, from the position of the geometric centre and from preset data related to the theoretical profile of the tyre.

Preferably, said tyre is a green tyre.

Preferably, the detector comprises a photodetector or a device capable of detecting the electromagnetic radiation and providing an output signal proportional to the intensity of the radiation detected.

Even more preferably, the detector is a photoelectric sensor or photocell.

Further features and advantages will become more apparent from the detailed description of a preferred but non-exclusive embodiment of a method and an apparatus for handling tyres according to the present invention.

BRIEF DESCRIPTION OF THE DRAWINGS

Such description is given hereinafter with reference to the accompanying drawings, provided only for illustrative and, therefore, non-limiting purposes, in which:

FIGS. 2a-2f show the apparatus in FIG. 1 in different operating conditions;

Figure 1:
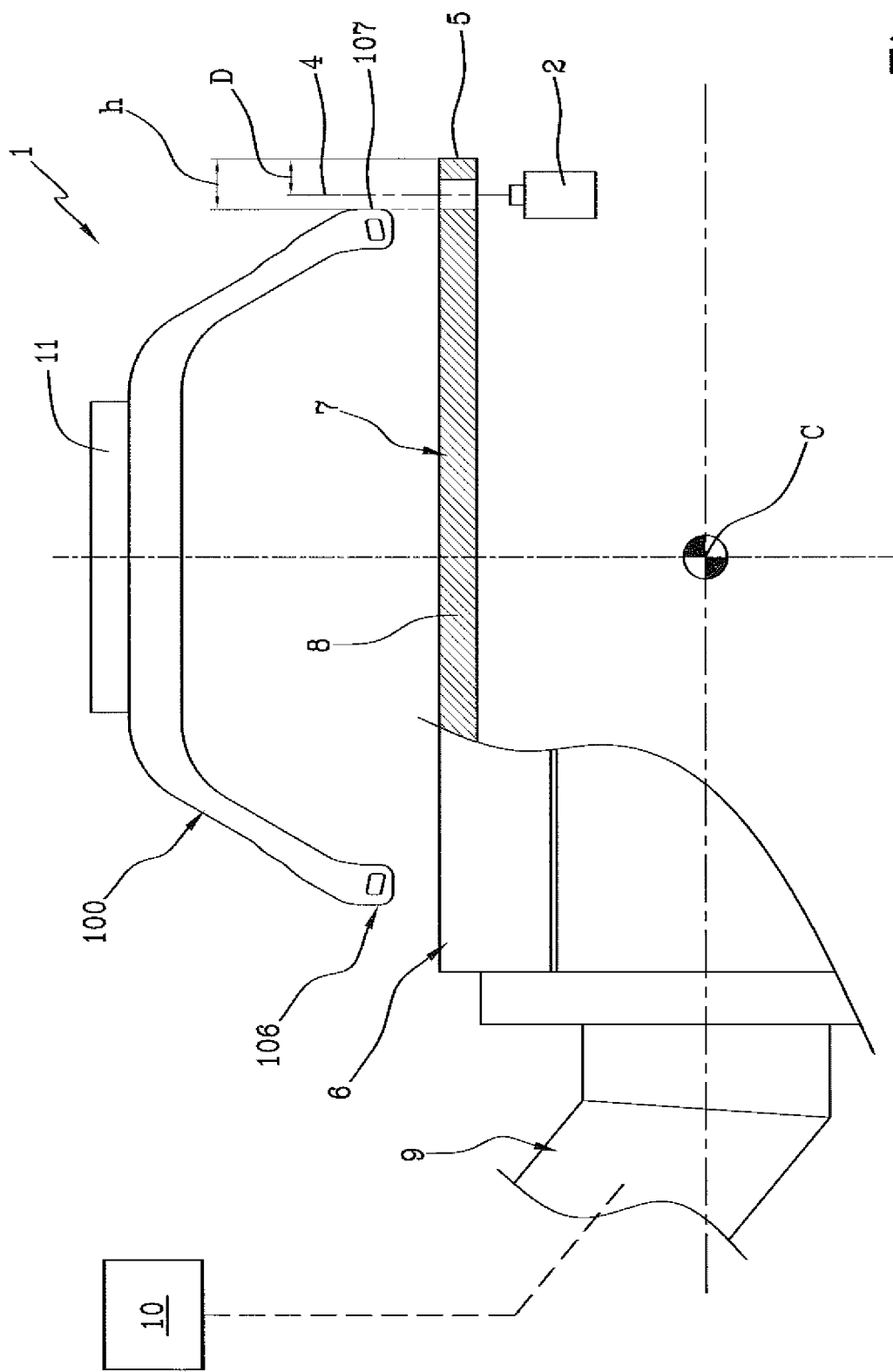
FIG. 1 schematically shows an apparatus for handling green tyres.

With reference to the mentioned figures, reference numeral 1 globally indicates an apparatus for handling green tyres.

Figure 3:
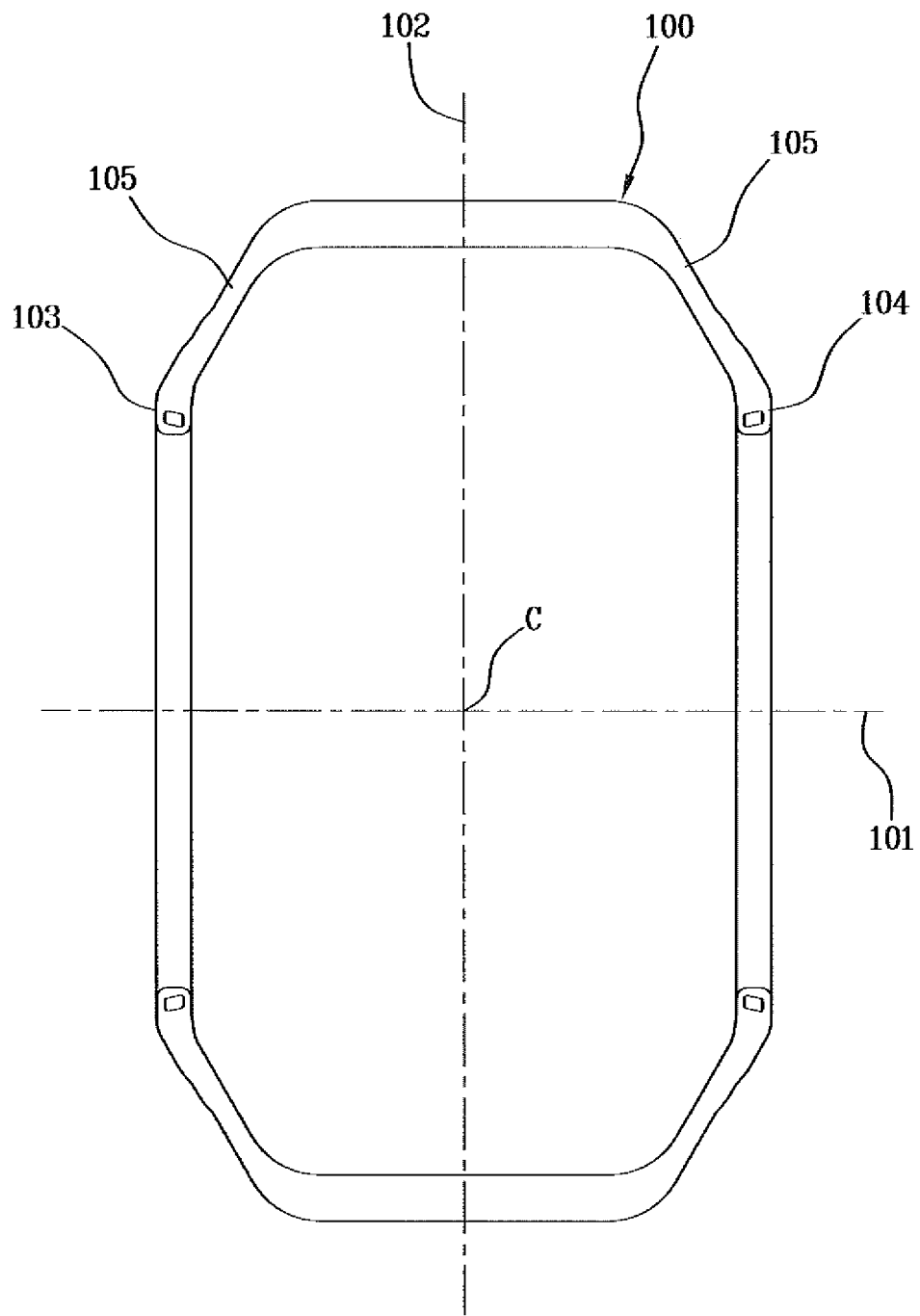
FIG. 3 shows a schematic axial sectional view of a green tyre.

FIG. 3 schematically shows a green tyre 100. The shape thereof is not stabilised since it has not yet been subjected to moulding and vulcanisation. In any case, it may be defined as a toroidal structure which is wound about an axis of rotation 101 and substantially symmetrical with respect to an axial middle line plane 102 perpendicular to the axis of rotation 101.

The axis of rotation 101 defines an axial direction of the green tyre.

In particular, the toroidal structure extends between two open ends generally defined by the term "beads" 103, 104 which, in the green tyre, represent the substantially outermost edges along the axial direction of the green tyre itself and are arranged respectively on opposite sides of the green tyre with respect to the axial middle line plane 102. Reference numeral 105 denotes the sidewalls of the green tyre 100.

In general terms, with reference to FIG. 1, the handling apparatus 1 comprises at least one detector 2 adapted to detect an edge of a green tyre 100 at a detecting line 4 defined by the detector itself. Detector 2 is positioned at a predetermined distance with respect to a reference 5.

With reference to the accompanying figures, detector 2 is a photocell.

With reference to FIG. 1, the handling apparatus 1 comprises a gripping device 6. Detector 2 is arranged in the gripping device 6 which thus comprises the detector itself.

In this case, detector 2 is positioned at a predetermined distance "D" with respect to reference 5 defined by one end of the gripping device 6. Moreover, detector 2 is movable with respect to the green tyre 100 integrally with the gripping device 6.

Preferably, the position of reference 5 on the gripping device 6 is known with respect to a predetermined reference system.

According to a possible embodiment, the gripping device 6 comprises a radial expansion clamp 7 provided with a plurality of radially expandable sectors 8. Preferably, detector 2 is arranged in one of sectors 8, even more preferably at a distance "D" from the free end of the radial expansion clamp 7 that defines reference 5 on the radial expansion clamp 7 itself. Preferably, the position of reference 5 on the radial expansion clamp 7 is known with respect to a predetermined reference system.

Preferably, detector 2 is arranged on the radial expansion clamp 7 in such a way that the detecting line 4 thereof is arranged perpendicularly to the axial development of the clamp itself.

The radial expansion clamp 7 is carried by one end of an anthropomorphic robot 9, which is part of the gripping device 6.

In this way, the radial expansion clamp 7 can be moved at an advance speed and a retraction speed with respect to the green tyre 100. Preferably, the radial expansion clamp 7 can be moved along the axial development thereof at an advance speed and a retraction speed parallel to an axial direction of the green tyre, as will be described in detail hereinafter.

The handling apparatus 1 further comprises a control unit 10 operatively associated with the gripping device 6 and programmed to execute one or more actions, as will be described hereinafter.

The handling apparatus 1 is adapted to carry out a method of handling tyres in which one or more ancillary actions are carried out on the green tyre, for example selected from:
applying a barcode;
applying one or more product labels;
releasing the green tyre 100 to an automatic management system, not shown.

The handling of the tyre may for example be carried out by means of the gripping device 6.

A green tyre 100 is preliminarily arranged to carry out at least one ancillary action thereon prior to moulding and vulcanisation.

For example, the green tyre 100 is picked from a building line, preferably at an assembling and shaping station, by means of a transfer device 11. Preferably, the transfer device 11 is an aerial transfer device adapted to retain the green tyre 100 at the radially outer surface thereof, i.e. at the tread band.

In use, the gripping device 6 grips the green tyre 100 and makes it available for subsequent actions. In particular, in the case of the radial expansion clamp, the anthropomorphic robot 9 inserts the radial expansion clamp 7 axially within the green tyre 100 and, once the correct relative positioning has been reached, expands it so as to grip it from the inside, i.e. at the so-called "beads". The anthropomorphic robot 9 then transfers the green tyre 100 to carry out the subsequent actions. As will be described hereinafter, by acquiring the position of two reference edges of the tyres it is possible to optimise the subsequent handling, not only because the clamp is positioned correctly within the tyre but also because it is possible to calculate the geometric centre position of the tyre with respect to the clamp itself and with such data, by interpolating them with data of the originally expected theoretical profile, get to know the position in space of the tyre for the correct execution of the subsequent ancillary actions.

In the case of the application of a barcode, the tyre is directly handled by the gripping device 6, in particular by the anthropomorphic robot 9, which arranges it at a barcode application station.

In the case of the application of one or more product labels, the tyre is directly handled by the gripping device 6, in particular by the anthropomorphic robot 9, which arranges it at a product label application station.

If the green tyre 100 is released to an automatic management system, it is for example contemplated that the green tyre is placed on a holding basket, not shown, for example at least partially defined by a containment wall having frusto-conical shape.

The holding basket may comprise a further detector adapted to detect a further edge of the green tyre at a further detecting line defined by the further detector itself.

In order to handle the tyres, it is contemplated to generate a first relative motion between the detecting line 4 and the green tyre 100 and to acquire the position of a first edge 106 of the green tyre 100 with respect to reference 5. Thereafter, it is contemplated to generate a second relative motion between the detecting line 4 and the green tyre 100 and to acquire the position of a second edge 107 of the green tyre 100 with respect to reference 5.

Preferably, the first edge and the second edge are the axially outermost edges of the green tyre 100 arranged each at a bead 103, 104 respectively on opposite sides with respect to the axial middle line plane 102.

According to a possible embodiment, in order to generate the first relative motion, the detecting line and/or the green tyre 100 are moved parallel to the axial direction of the green tyre 100.

Preferably, the detecting line is moved within the green tyre.

According to a possible embodiment, in order to generate the second relative motion, the detecting line and/or the green tyre 100 are moved parallel to the axial direction of the green tyre 100. Preferably, the detecting line is moved within the green tyre 100.

Once the position of the first and second edge has been acquired, it is contemplated to grip the green tyre 100 on the basis of the positions of the first and second edge 106-107 with respect to reference 5, for example by means of the gripping device 6, and preferably to determine the position of the geometric centre C of the green tyre with respect to reference 5 starting from the position of the first and second edge.

According to a possible embodiment, the green tyre 100 is gripped by the radial expansion clamp 7 on the basis of the position of the first and second edge 106, 107 with respect to reference 5. In this case, gripping the green tyre 100 comprises radially expanding the radial expansion clamp 7 within the green tyre 100 on the basis of the position of the first edge 106 and of the second edge 107.

Preferably, the control unit 10 programmed for:
generating the first relative motion between the detecting line 4 and the green tyre 100 and acquiring the position of the first edge 106 with respect to reference 5;
generating the second relative motion between the detecting line 4 and the green tyre 100 and acquiring the position of the second edge 107 with respect to reference 5;
actuating the gripping device gripping the green tyre 100 on the basis of the positions of the first and second edge 106-107 with respect to reference 5.

According to a possible embodiment, it is further contemplated to calculate distance L between the first and second edge 106, 107. According to a possible embodiment, the control unit 10 is programmed for such a calculation.

The control unit 10 is further programmed for calculating the geometric centre C, i.e. for determining the position of the geometric centre C of the green tyre with respect to reference 5 starting from the position of the first and second edge, for example starting from distance L between the first and the second edge 106, 107.

According to a possible embodiment, the control unit 10 is programmed for moving the clamp within the green tyre to generate the first and second relative motion and to radially expand the radial expansion clamp 7 within the green tyre 100 on the basis of the position of the first edge 106 and of the second edge 107.

According to a possible embodiment, it is further contemplated to determine the position in space of the green tyre starting from the position of the first and second edge, from the position of the geometric centre "C" and from preset data related to the profile of the tyre. In particular, the geometric centre "C" position of the green tyre 100 is determined with respect to the gripping device 6, preferably the radial expansion clamp 7.

Before gripping the green tyre 100, it is contemplated to generate a relative positioning motion between the gripping device 6, preferably the radial expansion clamp 7, and the green tyre 100 to reach a predetermined mutual gripping position in which the gripping device 6 protrudes by a predetermined distance "h" from the first or the second edge 106, 107.

According to a possible embodiment, the control unit 10 is programmed for generating such a relative positioning motion.

Moreover, the control unit 10 is programmed for handling the green tyre during the ancillary actions, as described above.

With reference in particular to the support on the holding basket, the green tyre is moved at a support speed parallel to the axial direction of the green tyre up to encounter the further detecting line arranged for example parallel to the containment wall of the holding basket. The control unit 10 is programmed for lying the green tyre on the holding basket as a function of the position of an outer edge of the green tyre 100 arranged at a sidewall 108.

Figure 2A:
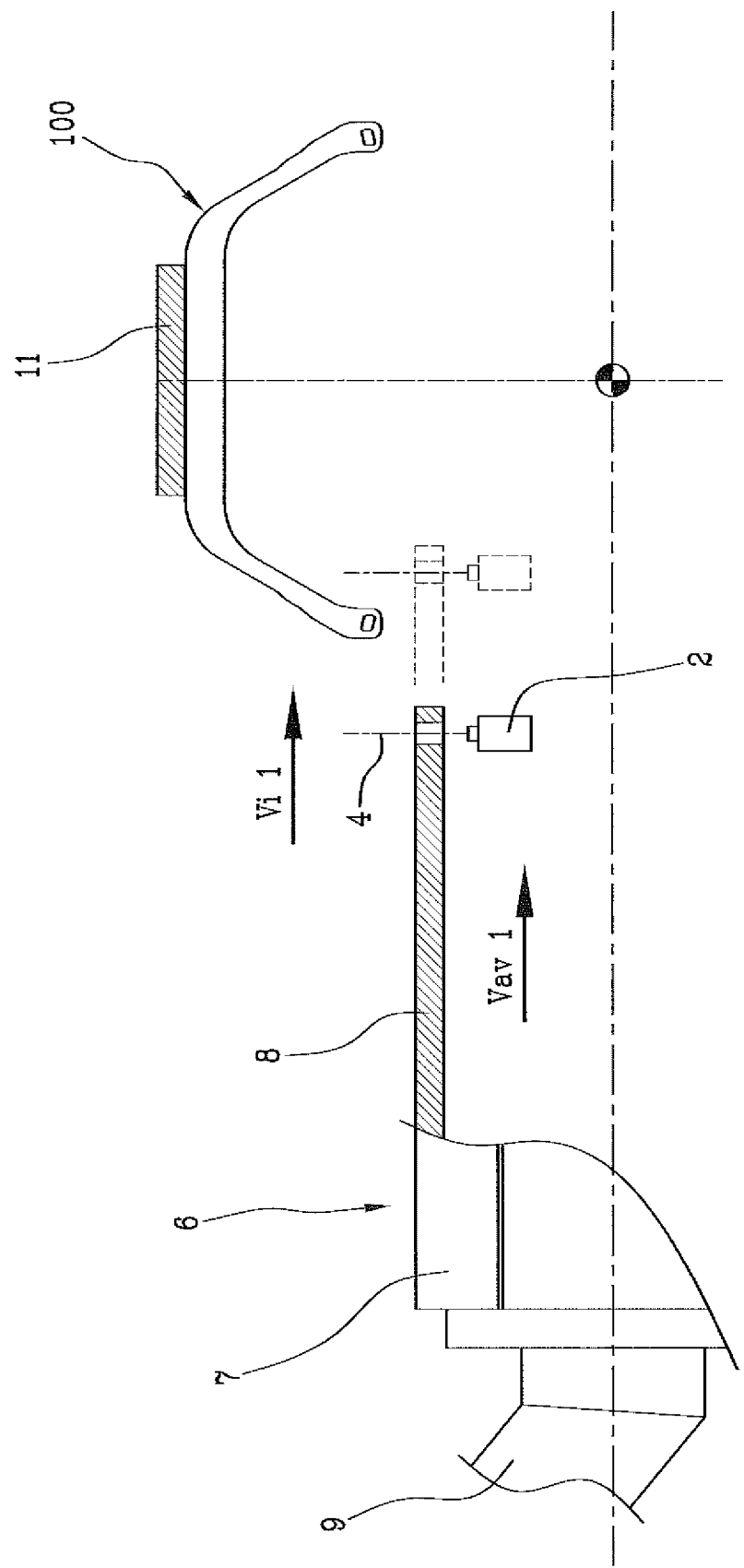
Figure 2B:
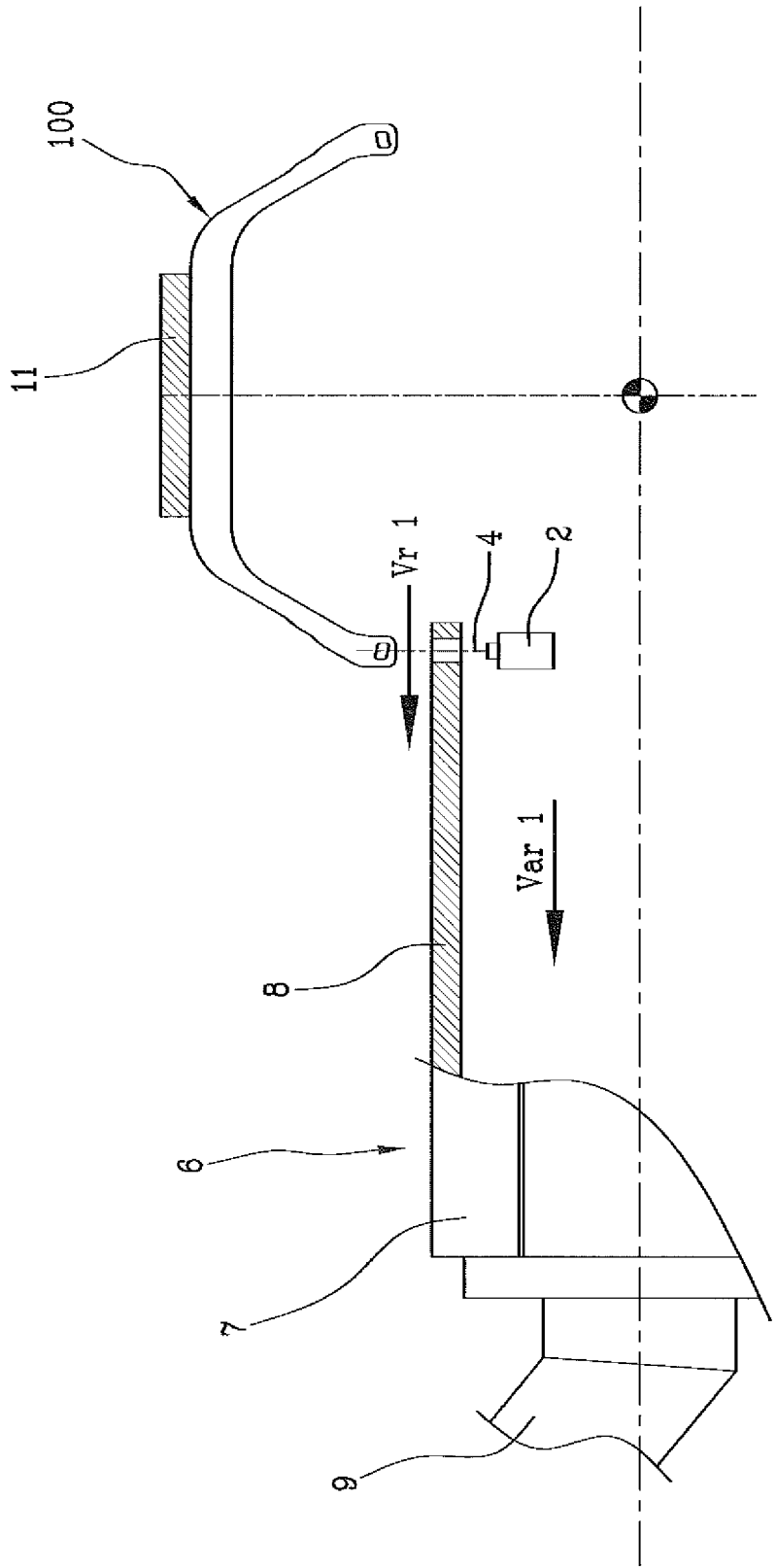

The acquisition of the position of at least one edge of the tyre with reference to the first edge 106 of the green tyre 100 is described hereinafter with reference to FIGS. 2a-2b.

This acquisition includes a first action in which a first relative intercepting motion is generated between the detecting line 4 of detector 2 and the green tyre 100. In this first relative intercepting motion, the detecting line 4 has a first controlled intercepting speed Vi1 with respect to the green tyre 100 having a direction adapted to intercept the first edge 106. Preferably, the first controlled intercepting speed Vi1 is parallel to the axial direction of the green tyre 100.

In order to generate the controlled intercepting speed Vi1, detector 2 is moved within the green tyre 100 at a first advance speed Vav1 parallel to the axial direction of the green tyre 100. Then, the first relative intercepting motion is continued until the detecting line 4 intercepts the first edge 106 of the green tyre 100.

The first relative intercepting motion is then inverted, thus generating a first relative detecting motion between the detecting line 4 and the green tyre 100. In this first relative detecting motion, the detecting line 4 has a first controlled detecting speed Vr1 with respect to the green tyre 100 having opposite direction and lower modulus than the first controlled intercepting speed Vi1.

The first relative detecting motion is continued until the detecting line 4 intercepts the first edge 106 again, detecting the position thereof with respect to reference 5.

In order to generate the first controlled detecting speed Vr1, the gripping device 6 and thus detector 2 integral thereto is moved within the green tyre at a first retraction speed Var1 parallel to the axial direction of the green tyre.

Preferably, the first retraction speed Var1 has opposite direction and lower modulus than the first advance speed Vav1.

The acquisition of the position of the first edge 106 includes storing such position with respect to reference 5.

In the case of the radial expansion clamp 7, this is moved along the axial development thereof at the first advance speed Vav1 and at the first retraction sped Var1 by means of the anthropomorphic robot 9. Moreover, the radial expansion clamp 7 and thus detector 2 is moved within the green tyre.

Figure 2C:
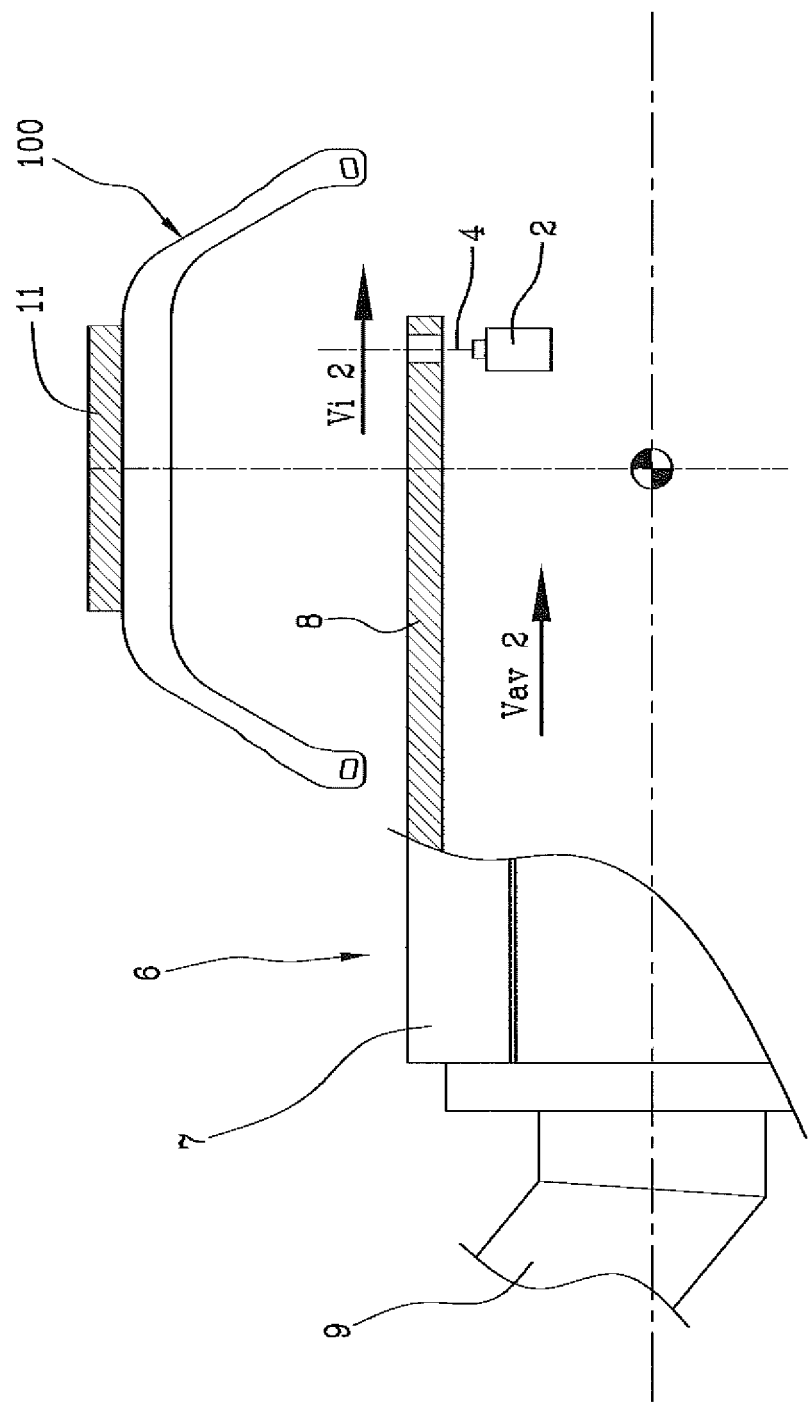

The acquisition of the position of the second edge of tyre 107 is described hereinafter with reference to FIGS. 2c-2d. In particular, the actions carried out for the first edge 106 are repeated for the second edge 107 by storing both the position of the first edge 106 and the position of the second edge 107 with respect to reference 5.

In particular, it is contemplated to generate a second relative intercepting motion in which the detecting line 4 has a second controlled intercepting speed Vi2 with respect to the green tyre 100 having a direction adapted to intercept the second edge 107. Preferably, the second controlled intercepting speed Vi1 is equal to the first controlled intercepting speed Vi1.

According to a possible embodiment, the second controlled intercepting speed Vi2 is parallel to an axial direction of the green tyre 100.

In the case of the handling apparatus 1 described above, in order to generate the second controlled intercepting speed Vi2, the gripping device 6, and thus detector 2 integral thereto are moved within the green tyre at an advance speed Vav2 parallel to the axial direction of the green tyre.

Then, the second relative intercepting motion is continued until the detecting line 4 intercepts the second edge 107 and the second relative intercepting motion is inverted, thus generating a second relative detecting motion between the detecting line and the green tyre 100. In this second relative detecting motion, the detecting line 4 has a second controlled detecting speed Vr2 with respect to the green tyre 100 having opposite direction and lower modulus than the second controlled intercepting speed Vi2.

Preferably, the second controlled detecting speed Vr2 is equal to the first controlled detecting speed Vr1.

The second relative detecting motion is continued until the detecting line 4 intercepts the second edge 107 again, detecting the position thereof with respect to reference 5.

In order to generate the second controlled detecting speed Vr2, the gripping device 6 and thus detector 2 is moved within the green tyre 100 at a second retraction speed Var2 parallel to the axial direction of the green tyre 100.

Preferably, the second retraction speed Var2 has opposite direction and lower modulus than the second advance speed Vav2.

The acquisition of the position of the second edge 107 includes storing such position with respect to reference 5.

In the case of the radial expansion clamp 7, this is moved along the axial development thereof at the second advance speed Vav2 and at the second retraction sped Var2 by means of the anthropomorphic robot 9. Moreover, the radial expansion clamp 7 and thus detector 2 is moved within the green tyre.

Figure 2E:
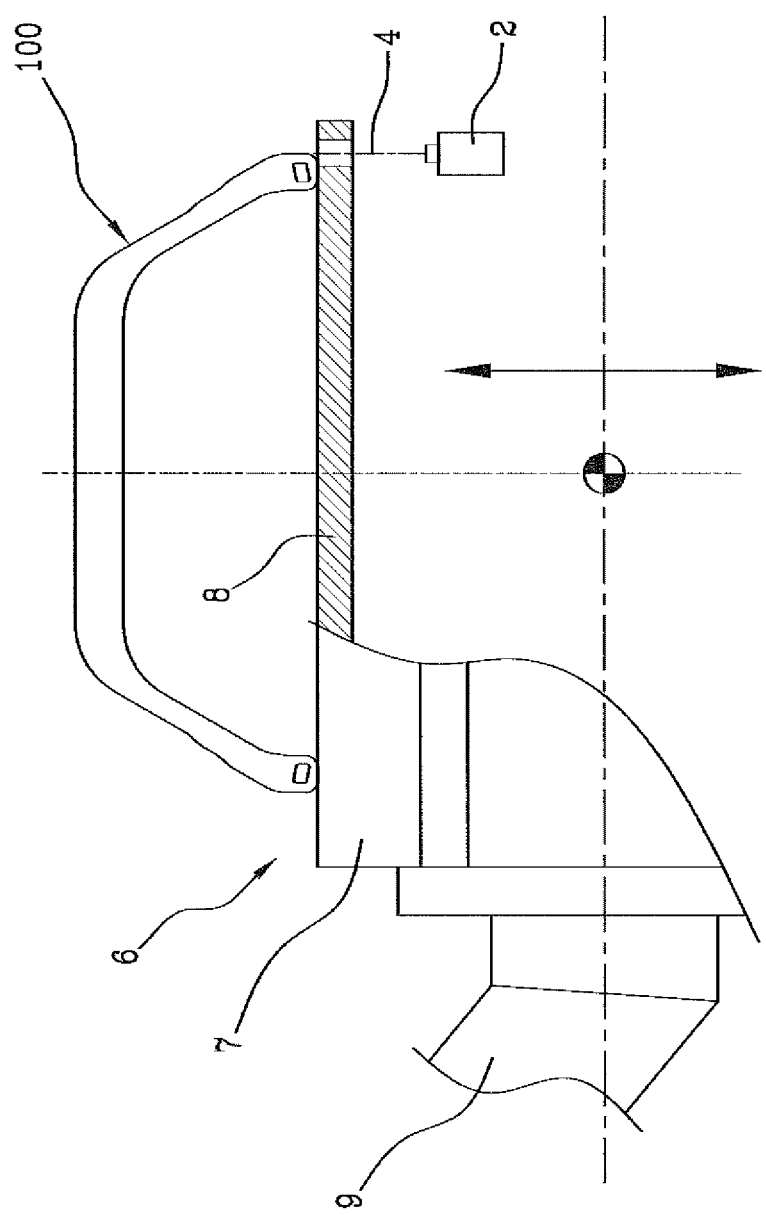

FIG. 2e schematically shows the moment when, once the position of the first and second edge has been acquired, the green tyre 100 is gripped on the basis of the positions of the first and second edge 106-107 with respect to reference 5, with the consequent removal of the transfer device 11. In particular, the radial expansion clamp 7 is expanded within the green tyre 100.

Figure 2F:
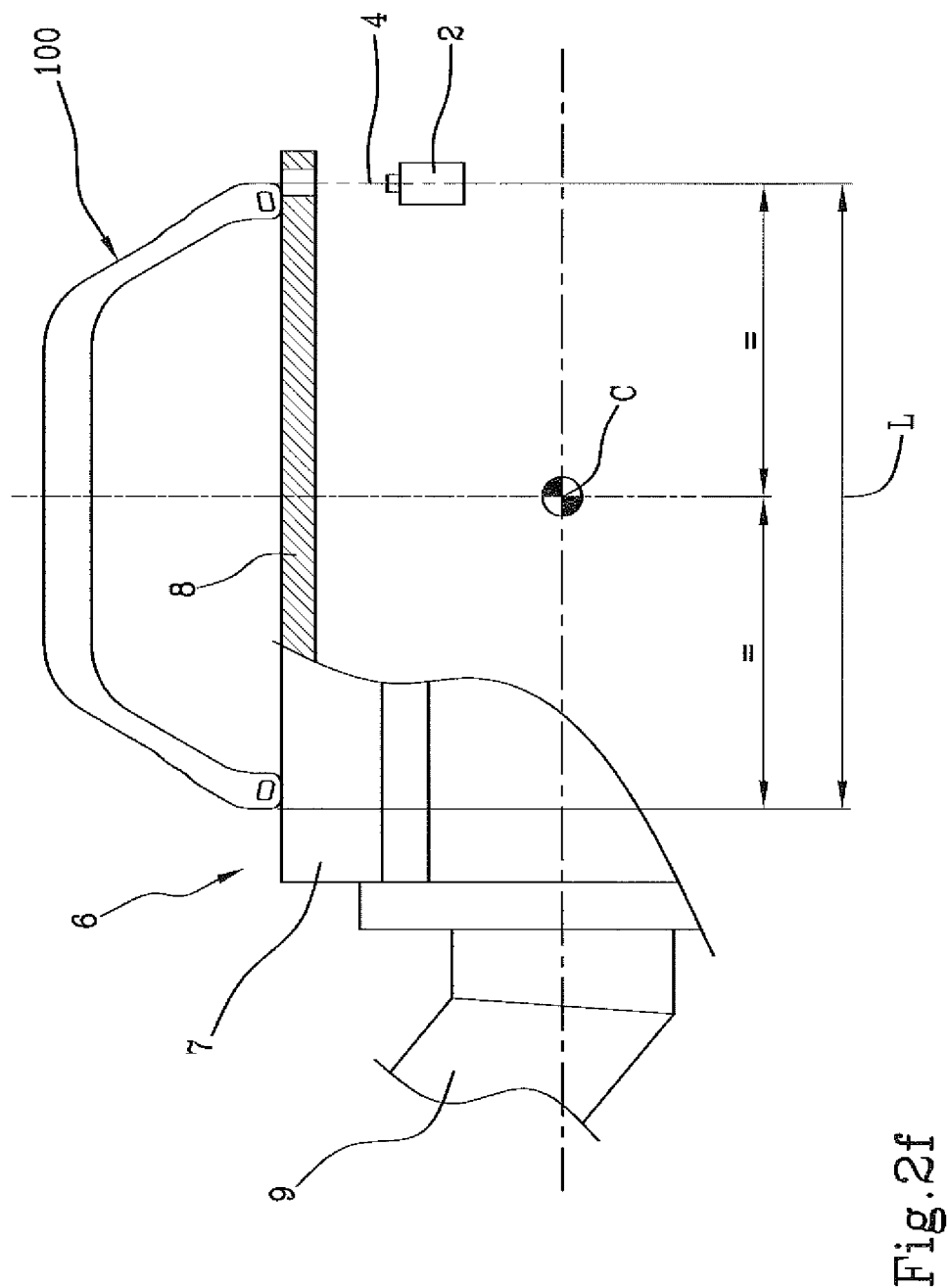

FIG. 2f shows the final moment when the green tyre 100 is gripped by the gripping device 6, in particular by the radial expansion clamp 7.

In the above description, specific reference has been made to a method and an apparatus for handling green tyres. The man skilled in the art may adapt the teachings of the present invention also to the handling of moulded and vulcanised tyres without departing from the scope of protection of the claims.

The invention claimed is:

1. A method of handling tyres, comprising:
    generating a first relative motion between a detecting line and a tyre to acquire by the detecting line the position of a first edge of the tyre with respect to a reference;
    generating a second relative motion between the detecting line and the tyre to acquire by the detecting line the position of a second edge of the tyre with respect to the reference; and positioning a gripping device by a control unit and gripping the tyre on as a function of the positions of the first and second edge with respect to the reference,
wherein the first edge and the second edge are each arranged at a bead on opposite sides of the tyre with respect to an axial middle line plane of the tyre.

2. The method of handling tyres according to claim 1, wherein generating the first relative motion and the second relative motion comprises moving at least one of the detecting line and the tyre parallel to an axial direction of the tyre.

3. The method of handling tyres according to claim 2, wherein the detecting line is arranged perpendicular to the axial direction.

4. The method of handling tyres according to claim 2, wherein generating the first relative motion and the second relative motion comprises moving at least one of the detecting line and the tyre substantially according to the axial direction of the tyre.

5. The method of handling tyres according to claim 1, wherein the first edge and the second edge are the axially outermost edges of the tyre.

6. The method of handling tyres according claim 1, further comprising calculating a geometric centre of the tyre with respect to the reference by starting from a distance between the first and second edge.

7. The method of handling tyres according to claim 6, further comprising determining the position in space of the tyre starting from the position of the first and second edge, from the position of the geometric centre, and from preset data related to a theoretical profile of the tyre.

8. The method of handling tyres according to claim 1, wherein the gripping device is integral with the detecting line and defines the reference.

9. The method of handling tyres according to claim 1, wherein positioning the gripping device comprises generating a relative positioning motion between the gripping device and the tyre for reaching a predetermined mutual gripping position, wherein the gripping device protrudes by a predetermined distance from the first or second edge before gripping the tyre.

10. The method of handling tyres according to claim 1, wherein the gripping device with a radial expansion clamp comprises the reference and is carried by an end of an anthropomorphic robot movable with respect to the tyre, the detecting line is arranged on a sector of the radial expansion clamp, and wherein gripping the tyre comprises expanding the radial expansion clamp within the tyre on the basis of the position of the first edge and the second edge.

11. A method of handling tyres, comprising:
generating a first relative motion between a detecting line and a tyre to acquire by the detecting line the position of a first edge of the tyre with respect to a reference;
generating a second relative motion between the detecting line and the tyre to acquire by the detecting line the position of a second edge of the tyre with respect to the reference; and
positioning a gripping device by a control unit and gripping the tyre on as a function of the positions of the first and second edge with respect to the reference,
wherein generating at least one of the first relative motion and the second relative motion comprises generating a relative intercepting motion wherein the detecting line has a controlled interception speed with respect to the tyre and has a direction to intercept at least one of the first edge and the second edge of the tyre, respectively, wherein generating the first or the second relative motion further comprises:
continuing the relative intercepting motion until the detecting line intercepts the first edge or the second edge of the tyre;
inverting the relative intercepting motion by generating a relative detecting motion between the detecting line and the tyre, wherein the detecting line has a controlled detecting speed with respect to the tyre and has opposite direction and lower modulus than the controlled intercepting speed; and
continuing the relative detecting motion until the detecting line intercepts the first edge or the second edge again and detects the position thereof with respect to the reference.

12. The method of handling tyres according to claim 1, further comprising:
carrying out one or more ancillary actions on the gripped tyre based on the positions of the first and second edge with respect to the reference, wherein the ancillary action comprises one or more of the actions chosen from:
applying a barcode;
applying one or more product labels; and
releasing the tyre to an automatic management system.

13. A tyre-handling apparatus comprising:
a gripping device comprising one or more detectors to detect an edge of a tyre at a detecting line defined by the detector, wherein the detector is positioned at a predetermined distance with respect to a reference; and
a control unit operatively associated with the gripping device and programmed to execute a handling method of the tyres comprising:
generating a first relative motion between the detecting line and the tyre to acquire by the detecting line the position of a first edge of the tyre with respect to the reference;
generating a second relative motion between the detecting line and the tyre to acquire by the detecting line the position of a second edge of the tyre with respect to the reference; and
positioning the gripping device by the control unit and gripping the tyre on as a function of the positions of the first and second edge with respect to the reference, wherein generating at least one of the first relative motion and the second relative motion comprises generating a relative intercepting motion wherein the detecting line has a controlled interception speed with respect to the tyre and has a direction to intercept at least one of the first edge and the second edge of the tyre, respectively, wherein generating the first or the second relative motion further comprises:
continuing the relative intercepting motion until the detecting line intercepts the first edge or the second edge of the tyre;
inverting the relative intercepting motion by generating a relative detecting motion between the detecting line and the tyre, wherein the detecting line has a controlled detecting speed with respect to the tyre and has opposite direction and lower modulus than the controlled intercepting speed; and
continuing the relative detecting motion until the detecting line intercepts the first edge or the second edge again and detects the position thereof with respect to the reference.

14. The tyre-handling apparatus according to claim 13, wherein the gripping device comprises a radial expansion clamp provided with a plurality of radially expandable sectors, and wherein the radial expansion clamp is carried by an end of an anthropomorphic robot.

15. The tyre-handling apparatus according to claim 14, wherein the control unit:
moves the radial expansion clamp inside the tyre to generate the first and second relative motion; and
expands the radial expansion clamp within the tyre based on the position of the first edge and the second edge.

16. The tyre-handling apparatus according to claim 14, wherein the one or more detectors are arranged on one of the sectors of the radial expansion clamp so that the detecting line is arranged perpendicular to the sector.

17. The tyre-handling apparatus according to claim 14, wherein the one or more detectors are arranged on one of the sectors of the radial expansion clamp at a distance from the free end of the radial expansion clamp to define the reference on the radial expansion clamp itself.

18. The tyre-handling apparatus according to claim 13, wherein the control unit is programmed to generate a relative positioning motion between the gripping device and the tyre to reach a predetermined mutual gripping position, and wherein the gripping device protrudes by a predetermined distance from the first or second edge before gripping the tyre.

19. The method of handling tyres according to claim 11, wherein generating the first relative motion and the second relative motion comprises moving at least one of the detecting line and the tyre parallel to an axial direction of the tyre.

20. The method of handling tyres according to claim 19, wherein the detecting line is arranged perpendicular to the axial direction.

21. The method of handling tyres according to claim 19, wherein generating the first relative motion and the second relative motion comprises moving at least one of the detecting line and the tyre according to the axial direction of the tyre.

22. The method of handling tyres according to claim 11, wherein the first edge and the second edge are the axially outermost edges of the tyre.

23. The method of handling tyres according claim 11, further comprising calculating a geometric centre of the tyre with respect to the reference by starting from a distance between the first and second edge.

24. The method of handling tyres according to claim 23, further comprising determining the position in space of the tyre starting from the position of the first and second edge, from the position of the geometric centre, and from preset data related to a theoretical profile of the tyre.

25. The method of handling tyres according to claim 11, wherein the gripping device is integral with the detecting line and defines the reference.

26. The method of handling tyres according to claim 11, wherein positioning the gripping device comprises generating a relative positioning motion between the gripping device and the tyre for reaching a predetermined mutual gripping position, wherein the gripping device protrudes by a predetermined distance from the first or second edge before gripping the tyre.

27. The method of handling tyres according to claim 11, wherein the gripping device with a radial expansion clamp comprises the reference and is carried by an end of an anthropomorphic robot movable with respect to the tyre, the detecting line is arranged on a sector of the radial expansion clamp, and wherein gripping the tyre comprises expanding the radial expansion clamp within the tyre on the basis of the position of the first edge and the second edge.

28. The method of handling tyres according to claim 11, further comprising:
carrying out one or more ancillary actions on the gripped tyre based on the positions of the first and second edge with respect to the reference, wherein the ancillary action comprises one or more of the actions chosen from:
applying a barcode;
applying one or more product labels; and
releasing the tyre to an automatic management system.

* * * * *

UNITED STATES PATENT AND TRADEMARK OFFICE
CERTIFICATE OF CORRECTION

| | |
|---|---|
| PATENT NO. | : 11,691,367 B2 |
| APPLICATION NO. | : 16/060763 |
| DATED | : July 4, 2023 |
| INVENTOR(S) | : Antonio Mirto et al. |

It is certified that error appears in the above-identified patent and that said Letters Patent is hereby corrected as shown below:

On the Title Page

Item (72):
"Stefano Giovanni, Milan (IT)" should read -- Stefano SANGIOVANNI, Milan (IT) --

Signed and Sealed this
Thirtieth Day of January, 2024

Katherine Kelly Vidal
*Director of the United States Patent and Trademark Office*